United States Patent [19]
Cheers et al.

[11] 3,713,666
[45] Jan. 30, 1973

[54] RIDE CYLINDER

[75] Inventors: Ronald M. Cheers, Mentor; Johannes Fisch, Euclid, both of Ohio

[73] Assignee: Euclid, Inc., Cleveland, Ohio

[22] Filed: Sept. 14, 1970

[21] Appl. No.: 71,836

[52] U.S. Cl. ............................. 280/124 R, 267/63 R
[51] Int. Cl. ............................................... B60g 11/26
[58] Field of Search .................. 267/63 R; 280/124 F

[56] References Cited

UNITED STATES PATENTS 3,537,696   11/1970   Webster ............................. 267/63 R
3,434,708   3/1969    Hawk ................................. 267/63 R

*Primary Examiner*—Philip Goodman
*Attorney*—Watts, Hoffmann, Fisher & Heinke

[57] ABSTRACT

A vehicle suspension especially for off-the-highway trucks including a pair of ride cylinders supporting a part of the sprung weight of the vehicle. Each ride cylinder comprises an outer tubular housing pivotally connected to the frame and an inner tubular housing, telescoping within the outer, pivotally connected to a part of the vehicle running gear such as an axle. A series of elastomeric pads stacked upon each other inside the cylinders yieldably absorb oscillations of the frame and axle. All of the pads coact in absorbing compressive load deflections in one direction telescoping the housings into each other. A cylinder mechanism operates with a smaller group of the same pads in damping rebound loads acting in the opposite direction tending to telescope the housings apart. The bi-directional energy absorption capacity provides a smoother ride without reducing the overall load carrying capacity of the cylinder.

8 Claims, 7 Drawing Figures

PATENTED JAN 30 1973 3,713,666

INVENTORS.
RONALD M. CHEERS
JOHANNAS FISCH
BY Watts, Hoffmann,
Fisher & Heinke
ATTORNEYS.

INVENTORS.
RONALD M. CHEERS
JOHANNAS FISCH
BY Watts, Hoffmann, Fisher & Heinke
ATTORNEYS.

RIDE CYLINDER

BACKGROUND OF THE INVENTION

1. Field of the Invention

Off-the-highway haulers having payload capacities of in the order of one hundred tons encounter special problems not found in over-the-highway tractors or trucks having lighter hauling capacities. The suspension systems of off-the-highway trucks capable of carrying loads of this magnitude while stabilizing the vehicle over extremely rough terrain are especially designed to provide a variable rate energy absorption capacity increasing with the loading conditions.

2. Prior Art

One type of suspension employs shock absorbers in the form of telescoped ride cylinders or struts containing elastomeric elements, usually rubber pads or washers, which compress elastically to absorb load deflections of the axle or frame. The pads, while separate, are yieldably compressed as an integral column by the telescoping action of the cylinder. Each is typically annular in shape and when stacked, one upon the other, the pads form a hollow column down through which a guide rod extends. The guide rod is slidable through one end of the cylinder and holds the rubber pad column in vertical alignment. A stop on the exterior end of the rod contacts the cylinder outer end upon rebound to prevent overtravel.

Suspensions equipped with such ride cylinders have a variable rate, elastic energy absorption capability. The rubber pads increasingly resist cylinder deflection as the loading increases as a function of the elastomeric properties of the rubber and the number and shape of the pads. The elastomeric pad column absorbs energy by elastic deformation when squeezed between the ends of the two telescoping tubular housings. Any extension of the housings, however, as occurs during rebound, is totally unrestrained. An abrupt stop occurs when the end of the cylinder contacts the end of the guide rod to prevent overtravel regardless of whether all of the rebound energy has been dissipated. This is the opposite of a shock absorbing action and consequently a jarring force is usually transmitted to the frame. Thus an inherent deficiency of the elastic ride cylinder has been its inherent inability to damp or dissipate shocks encountered on rebound.

SUMMARY OF THE INVENTION

In the present invention a suspension carries a part of the sprung weight of the vehicle on a pair of ride cylinders each receiving a piston and piston rod. The ride cylinder may be connected to the frame and the piston rod to a part of the running gear of the vehicle such as the axle. The cylinders mutually collapse and extend in response to relative vertical movement of the axles tending to balance and evenly distribute the sprung vehicle weight. An elastomeric column substantially fills each cylinder with sufficient interior space for elastic deformation being provided. The piston itself is spaced from one end of the cylinder. It is slidably carried on the piston rod so that in one direction of reciprocation the entire volume of the elastomeric column is elastically deformed between the ends of the cylinder while in the reverse direction, the piston is carried axially with the piston rod compressing a portion of the elastomeric column in the space between it and one end of the cylinder. Thus the ride cylinders are effective as shock absorbers in two directions of movement.

The piston moves relative to the piston rod as a part of the elastomeric column in supporting the sprung weight of the vehicle. This enables the entire elastomeric column to be used for maximum energy absorbing capacity in damping the greater load deflections. In the reverse direction, when the axle and frame rebound apart, the piston is carried with the piston rod compressing a smaller portion of the elastomeric column in retarding rebound movement.

In the preferred embodiment, the elastomeric column takes the form of a series of elastic pads or washers stacked one upon the other and defining a central passageway in which the piston rod reciprocates. The pads themselves may take a variety of forms, i.e., toroidal or donut-shaped, flat annular or disc-shaped or even rectangular. The pads may have a central metal stiffening plate on each side of which is vulcanized a thick rubber facing. The combined volume of rubber, its elastomeric properties and the shape of the rubber cross section determine the overall elastic energy absorption capacity. Preferably the piston itself will be a rubber pad thus contributing to the energy absorption capacity of the entire column. In that case the stiffening plate of the piston pad will be modified to cooperate with the piston rod during rebound so that it will be carried with the rod to compress a group of other pads between the piston pad and cylinder.

The arrangement provides a ride cylinder having a variable energy absorption rate increasing with load deflections in both directions from a neutral or no load position. The principal advantage envisioned by the invention is the provision of a ride cylinder for use in heavy-duty, off-highway truck suspensions having a variable rate energy absorption capacity both in compression and extension of the ride cylinder.

This advantage is found in the provision of a ride cylinder of the type described where a part of the pads have a dual function. Part of the pads act with the total number of load carrying pads in supporting the sprung weight of the vehicle. This group of pads also absorb shock loads upon rebound. Thus the ride cylinder is a bi-directional shock absorber providing a much smoother ride without limiting the payload of the vehicle.

Another advantage envisioned for the invention is the provision of a ride cylinder in which the energy absorption medium is a series of stacked rubber pads and the cylinder mechanism includes a piston and piston rod which act to provide that bi-directional shock absorbing action is achieved without having to increase the number of rubber pads to meet the required primary shock absorbing load.

These and other advantages will be more apparent by referring to the following description and drawings illustrating a preferred embodiment of the invention wherein:

DETAILED DESCRIPTION OF THE PREFERRED EMBODIMENT

Figure 1:
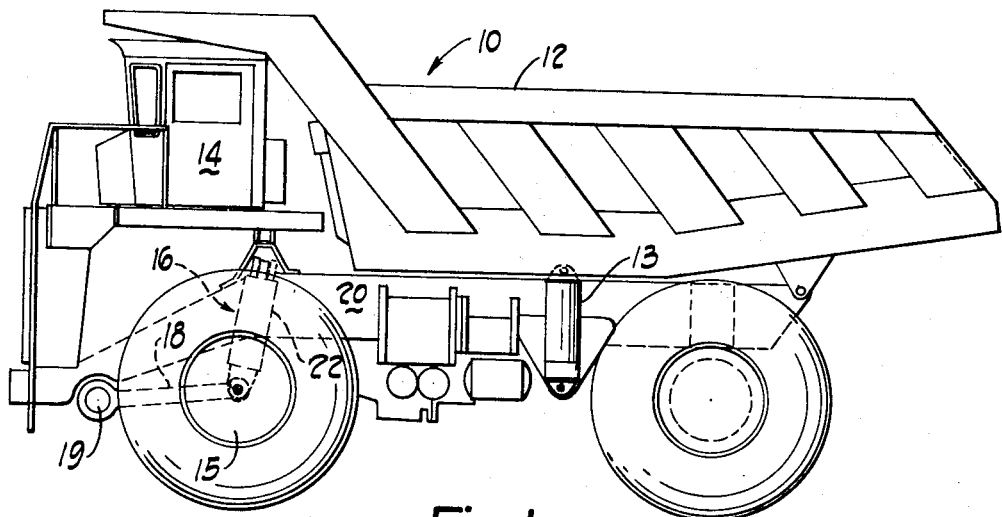
FIG. 1 is a side elevational view of an off-highway dump truck utilizing ride cylinders in accordance with the preferred embodiment of the invention.
Figure 1A:
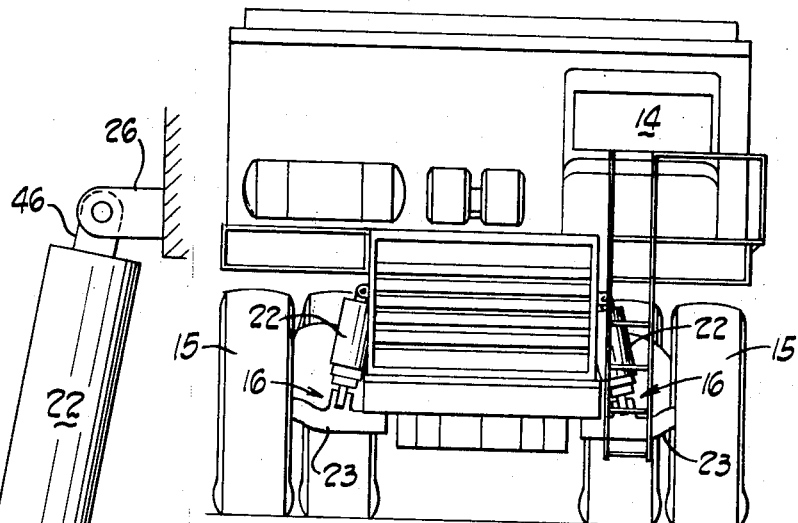
FIG. 1A is a front elevational view showing the front suspension system of the dump truck.
Figure 2:
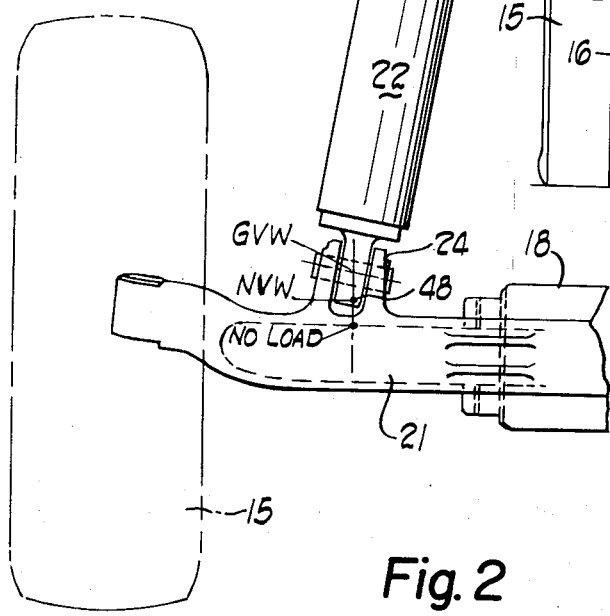
FIG. 2 is a fragmentary view of the right front suspension; showing the wheel, trailing arm and ride cylinder mounting and the relative compressed static state of the ride cylinder under various loaded conditions.

Referring now to FIGS. 1, 1A, an off-highway dump truck 10 has a dump body 12 which is raised and lowered by power cylinders 13 mounted on opposite sides of the truck. The driver rides in a cab 14 over the front wheels 15, each of which is independently sprung on a suspension unit generally indicated at 16. The suspension units 16 are the same except for one being for the left and the other for the right side. Each suspension unit 16 includes a trailing arm 18 pivotally mounted at 19 on the vehicle frame 20 forward of the wheels. The wheels 15 are carried on an axle portion 21 of the trailing arm 18. A pair of ride cylinders 22 extends between the trailing arms 18 and the truck frame. As best shown in FIG. 2, the lower end of each ride cylinder 22 is journaled in a boss 24 on the laterally extending axle portion 21 approximately midway between the trailing section of the arm 18 and the outer end of the axle portion. The ride cylinders angle inwardly toward the frame from a vertical plane through the center of the pivotal connection and are journaled at their upper ends in a boss 26 extending outwardly from the frame. Each suspension unit 16 is designed to carry a part of the sprung weight of the truck. As depicted in FIG. 2, the ride cylinders are shown compressed under a static load equivalent to a gross vehicle weight (GVW), the distributive portion of which taken by each front suspension is approximately 35,000 pounds. Gross vehicle weight is the total weight of the truck plus payload. The corresponding positions for no load (cylinder preload only) and net vehicle weight (NVW) of about 7,500 pounds and 15,000 pounds, respectively, are represented at the points below indicating that the cylinders are compressed several inches (no load to NVW — 3 inches) in carrying the net spring vehicle weight (truck weight only) and are compressed several more inches (NVW to GVW — 3 inches) in carrying to gross vehicle weight for an overall compression of about 6 inches from no load to GVW.

Figure 3:
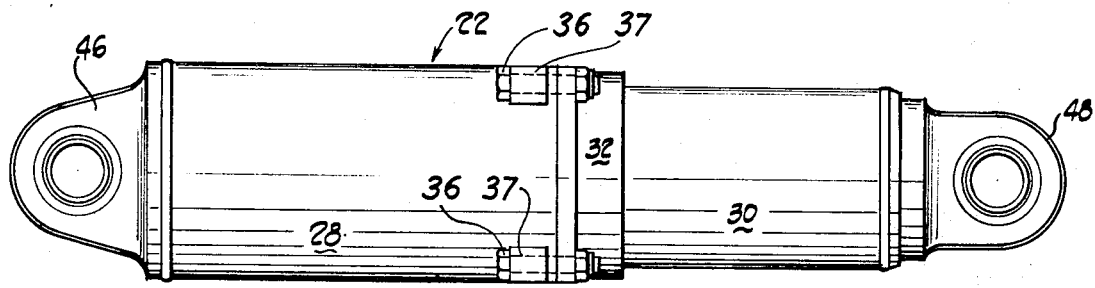
FIG. 3 is a dismounted side elevational view of the ride cylinder.
Figure 4:
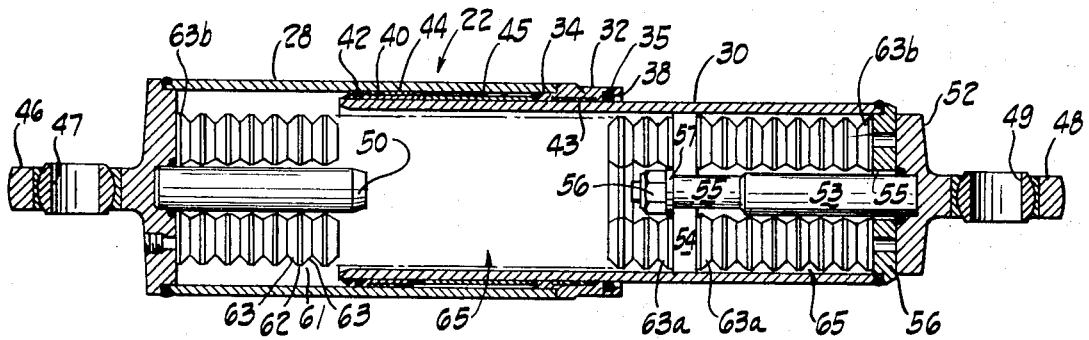
FIG. 4 is a longitudinal sectional view of the ride cylinder in FIG. 3.
Figure 5:
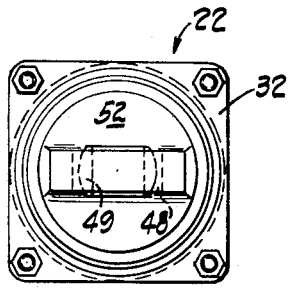
FIG. 5 is a bottom end view of the ride cylinder.

Referring now to FIGS. 3, 5 and 5, it will be seen that each ride cylinder 22 includes an outer tubular housing 28 and an inner tubular housing 30. The inner housing 30 telescopes into the open end of the outer housing 28. A collar 32 has a circumferential shoulder 34 received in the lower end of the outer housing 28 and an internal circumferential groove 35 carries a radial seal 38 in wiping contact with the reciprocating inner housing 30. A circumferential seal retainer 40 secured on the upper end of the inner housing 30 carries an O-ring 42 in sealing contact with the interior surface of the reciprocating outer housing 28. A lower guide bushing 43 reciprocates with the outer housing 28 and cooperates with an upper guide bushing 44 reciprocating with the inner housing 30. A spacer sleeve 45 in the circumferential space between the collar 32 and the seal retainer 40 limits the extent to which the outer and inner housings 28, 30 can be telescoped apart. Bolts 46 extend through ears 47 on the outer housing 28 and secure the collar 32 firmly against the spacer sleeve 45 which establishes a preload on the cylinder of about 7,500 pounds.

The cylinder upper end connection 46 to the frame boss 26 contains a spherical bearing 47 and the lower end connection 48 to the trailing arm 18 contains a spherical bearing 49 thus permitting some pivotal movement at each end of the ride cylinder to accommodate for any misalignment either laterally or in a fore and aft direction.

The upper end connection 46 carries a guide pin 50 which projects inwardly along the cylinder axis within the interior of the outer housing 28 and the lower end connection 48 has a circular base 52 from which extends a piston rod 53 axially inwardly of the inner housing 30. The piston rod 53 goes through a central hole 55 in the end wall 56 of the housing 30 and has a reduced diameter portion 55 at the opposite end on which a piston 54 is permitted to slide in one direction. A nut 56 and washer 57 on the end of the piston rod 53 stop the piston in the opposite direction in a manner described hereinafter.

Between the ends of the cylinder is a stacked array of elastomeric pads 61. The pads 61 each have a central annular metal plate 62 on opposite sides of which are vulcanized relatively thick annular rubber sections 63 having beveled edges. The stacked array of pads 61 extend from end to end within the cylinder providing an energy absorbing column 65 hollow through the center. The column 65 has an inside diameter at the plates 62 which is slightly greater than the diameters of the piston rod 53 and the guide pin 50. The outside diameter of the column 65 at the plates 62 is slightly less than the inside diameter of the inner tubular housing 30. The pads 61 are not interconnected and those which are not confined by the inner housing 30 are maintained in alignment by the guide pin 50. It is important to note that the piston 54 itself carries a rubber section 63a on each side. Thus the piston forms a part of the energy-absorbing column 65 as will be described below.

It will be appreciated that off-the-highway trucks must often travel over rough terrain carrying extremely heavy loads. The ride cylinders 22 must absorb most of the load deflections which would otherwise be transmitted to the frame as the suspension units 16 oscillate up and down. At one moment the cylinders 22 may be compressed with great force; and in the next instant they will be extended with sudden force in the opposite direction as the suspension units 16 rebound away from the frame. Heretofore elastic pad type ride cylinders have worked satisfactorily only in absorbing the compressive loads experienced when the ground engaging wheels and frame move toward each other and have not attempted to absorb the recoil or rebound forces. However, the present invention provides a ride cylinder mechanism which is designed to make elastic pad energy absorbers effective in both directions. More importantly, this bi-directional energy absorbing action is provided without loss of any of the total energy absorbing capacity of the cylinder.

Figure 6:
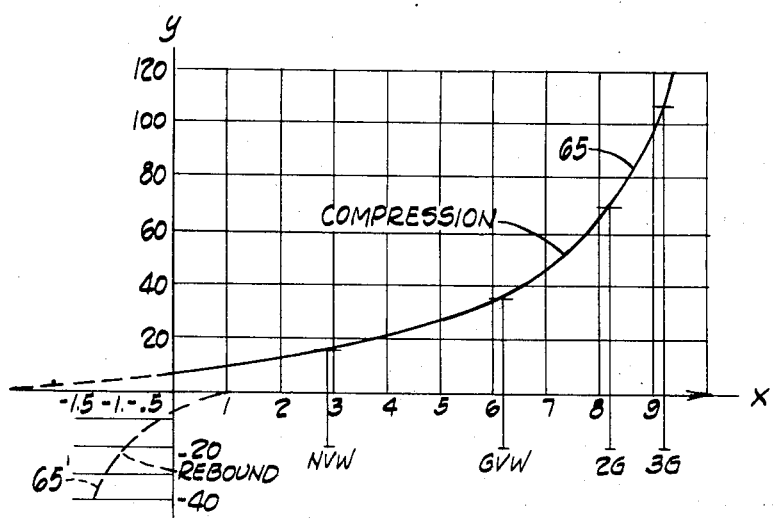
FIG. 6 is a diagram showing a typical load-deflection curve for the ride cylinder both in compression and rebound.

A load deflection curve for the cylinder 22 is shown in FIG. 6. Along the vertical y-axis, load is plotted in thousands of pounds and along the horizontal x-axis, deflection is plotted in inches. The deflection of the housings 28, 30, as depicted where the curve crosses the vertical y-axis, corresponds to the no load position represented in FIG. 2 — cylinder preload of 7,500 pounds. When installed in the suspension units 16, the static loading condition on the cylinders is increased to about 15,000 pounds reflecting the portion of the net weight of the vehicle (NVW) now being taken. This load will compress the cylinders about 3 inches as shown in FIG. 6. Under fully rated static load conditions, the weight of the vehicle plus payload (GVW), there will be deflection of about 6 inches at 35,000 pounds. This is the condition of the suspension units 16 as shown in FIG. 2. The maximum load of in excess of 100,000 pounds and a deflection of over 9 inches depicted by the line 3G in FIG. 6 would not be encountered in usual service and would represent an extreme shock loading condition. The load deflection of about 70,000 pounds and over 8 inches at 2G would be a shock loading of rather substantial magnitude and would not be exceeded in normal operation.

It will be appreciated that the spring rate is a function of the elastomeric properties of the rubber, the volume and shape of the rubber sections 63 and number of pads 61 used. The cylinders have a variable rate energy absorption capacity as reflected by the exponential shape of the load deflection curve in FIG. 6. The total area under this curve is indicative of the total energy absorption capacity of each cylinder when the tubular housings telescope into each other compressing the entire stack of pads 61. This capacity is available in damping the higher load deflections occurring in supporting the sprung weight of the vehicle. It is important to note that the piston 54 is allowed limited axial movement on the piston rod 53 in one direction, i.e., in a manner to permit end to end foreshortening of the elastomeric column 65. In addition the piston is an active part of the energy absorbing column 65 in that it carries a rubber section 63a on each side being equivalent to a single pad 61. Thus the piston itself contributes to the total energy absorbing capacity and fewer pads are required to produce the rate load carrying capacity.

In hauling heavy loads over rough terrain, off-the-highway truck suspensions often must absorb rebound forces great enough to cause extension of the ride cylinders beyond their allowable limit of extension. The tubular housings are driven apart with considerable force until, in the prior art cylinders previously described, a stop is engaged producing an abrupt shock which is transmitted to the frame.

In the present invention, assume that vertical movement of the frame and ground engaging wheels away from each other has extended the tubular housings 28, 30 to the maximum limit of extension permitted by the sleeve 45 and collar 32. Unlike the prior art ride cylinders, if the rebound energy has not been dissipated by this time, the invention provides that the lower cylinder connection 48 will extend carrying with it the piston rod 53 which in turn pulls the piston 54. The piston 54 is now prevented from axial movement on the piston rod 53 by the nut and washer 56, 57. A part of the pads 61 is thus compressed between the piston and the end wall 56 of the inner tubular housing 30. The excess rebound energy is now absorbed by the elastomeric column 65' which is made up of this group of pads.

Referring again to FIG. 6, and particularly the negative values on the load and deflection $x$ and $y$ coordinates, it will be seen that at the start of rebound, when the curve crosses the negative y-axis, the elastomeric column 65' is under some 7,500 pounds compression before any extension of the piston rod 53 occurs. This is the preload which is retained on column 65' when the cylinder is cycled in either direction, but is largely relieved from the pads above the piston when extension of the piston rod reaches about 1.5 inches (negative x-axis). The load on the rebound pads increases to approximately 15,000 pounds when the extension of the piston rod is in the order of 0.5 inch; at 20,000 pounds extension is 1.0 inch and at 30,000 pounds, 1.5 inches.

As may be observed by comparing the area under the rebound curve for the column 65' with that under the load deflection curve for the entire column 65, the energy absorption capacity in rebound of column 65' is substantially less than the energy-absorption capacity of the entire column 65. This reflects the fact that the major load absorbing capacity is used in supporting the sprung weight of the vehicle. Since piston 54 can slide axially on the piston rod 53 all of the pads in the entire elastomeric column 65, including the rebound pads comprising column 65', are compressed by the telescoping action of the tubular housings 28, 30. Thus the energy absorption capacity of the rebound pads is added to the overall energy-absorption capacity for the entire load column 65.

In the preferred embodiment, the ratio of rebound pads in the column 65' to the total number of pads in the load column 65 is in the order of one-to-four, i.e., for a total of about 24 pads (not including the cylinder end pads 63b and the piston pads 63a) six pads will be situated below the piston 54 and comprise the rebound pads of the column 65'. It is important to appreciate that the piston itself contributes to the energy-absorption capacity of the entire column 65 both because it is slidable on the piston rod 53 and because it carries on each side a rubber section 63a equivalent to the total volume of rubber of a single pad. Thus, the presence of the piston 54 in the column 65 does not appreciably diminish the elastomeric energy absorption capacity of the entire column.

While the invention has been described with respect to a ride cylinder employing a stacked array of elastomeric pads generally of a flat annular shape, it will be appreciated that the pad may take any form such as toroidal or donut-shaped, or the tubular housings may be rectangular instead of cylindrical and the pads themselves rectangular. Instead of separate pads, a continuous elastomeric column may be used on opposite sides of the piston 54; and instead of rubber any of a variety of polymers may be used having elastomeric properties; and various substances could be molded or confined within the cylinder to provide a resiliently compressible medium. A number of such variations may occur to those skilled in the art once having the benefit of the disclosure herein, such modifications and variations however are intended to be within the scope of the invention hereof as defined in the appended claims except insofar as limited by the prior art.

What is claimed is:

1. A suspension system between a sprung and unsprung mass comprising:
   a. a plurality of separate, elastomeric elements between said masses being interrelated in an associated array so as to yieldably transfer loads from one to the next;
   b. first reciprocated means connected to one of said masses and cooperating with the sprung and unsprung masses to load the elastomeric elements in a linear fashion causing said elements to coact in one load direction to yieldably absorb oscillations between said masses;
   c. second reciprocated means connected to said other mass and movable in unison with the associated array of elastomeric elements as required by the load deflections there-on in said one load direction and movable with said mass in the opposite load direction causing at least one of said elastomeric elements to be loaded in said last-named direction and yieldably absorb oscillation of said masses in that direction whereby oscillatory movement of said masses is absorbed in both load directions;
   d. said second reciprocated means including a piston situated between adjacent elastomeric elements of said column, and a piston rod slidably coupled to said piston and extending axially of said housings for connection with said one mass, said piston sliding on the piston rod as required by the load deflections on said elastomeric column in said one load direction and being prevented from sliding on the piston rod in the opposite load direction when the rod is extended from said housings whereby the elastomeric elements between the piston and one end or the housings are elastically compressed in said opposite load direction; and
   e. said piston being positioned relative to the opposite ends of said elastomeric column approximately one-fourth the distance from the end adjacent said one mass.

2. In an off-the-highway truck, a suspension system supporting a part of the sprung weight of the truck on ground engaging wheels including a pair of ride cylinders mutually acting to absorb oscillations between the truck running gear and frame, each ride cylinder comprising:
   a. a plurality of separate, elastomeric elements interrelated in an associated array so as to yieldably transfer loads from one to the next;
   b. a pair of tubular housings telescoped one within the other receiving said elastomeric elements therein connected at one end to the truck frame and cooperating at the opposite end with the running gear to load the elastomeric elements in a linear fashion causing said elements to coact in one load direction to yieldably absorb oscillations between the frame and running gear;
   c. said elastomeric elements being stacked one upon the other within said pair of tubular housings in an associated array providing an elastomeric column substantially filling said housings with sufficient space being provided therein for elastic deformation of said column;
   d. reciprocated means connected to the running gear and movable in unison with the associated array of elastomeric elements as required by the load deflections thereon in said one load direction and movable with said gear in the opposite load direction beyond a predetermined loading point causing at least one of said elastomeric elements to be loaded in said last-named direction and yieldably absorb oscillation of said masses in that direction whereby oscillatory movement between the frame and running gear is absorbed in both directions; and
   e. said reciprocated means including a piston situated between adjacent elastomeric elements in said column, and a piston rod slidably coupled to said piston and extending axially of said housings for connection with the truck running gear, said piston sliding on the piston rod as required by the load deflections in said elastomeric column in said one load direction and being prevented from sliding on the piston rod in the opposite load direction when the rod is extended from the housings whereby the elastomeric elements between the piston and one end of the housings are elastically compressed in said opposite load direction.

3. In an off-the-highway truck suspension according to claim 2 wherein:
   a. said elastomeric elements when stacked within said housings define an elastomeric column hollow through the center;
   b. the one of said housings being connected to the frame telescopes outside the other housing connected to the running gear, said housings telescoping together end-for-end in loading the elastomeric column in said one load direction when the frame and running gear move toward each other and the housings extending apart in said opposite load direction when the frame and running gear move apart;
   c. each of said elastomeric elements being in the form of a closed structure open at the center and when stacked within said housings defining an elastomer column hollow through the center, the width of which is slightly less than the inside width of the inner housing; and,
   d. said other housing having an internal guide rod extending from one end thereof axially of said column for preventing lateral shifting of said elastomeric elements not confined by said inner housing.

4. In an off-the-highway truck suspension according to claim 3, wherein each of said elastomeric elements is annular in shape, and comprises:
   a. a center rigid plate member; and
   b. thick elastomeric sections bonded on the opposite sides of said plate member, the outer circumferential edges of said elastomeric sections being beveled so as to provide in stacked array of said elastomeric column, a series of annular grooves providing spaces interiorly of said housings for expansion of said elastomeric sections in substantially radial directions relative to the axis of said housings.

5. In an off-the-highway truck suspension according to claim 4 wherein said piston is positioned relative to the opposite ends of said elastomeric column approximately one-fourth the distance from the end of said inner housing.

6. A ride mechanism providing a bi-directional variable rate energy absorption capacity, comprising:
   a. a plurality of separate, elastomeric elements interrelated in an associated array so as to yieldably transfer loads from one to the next;
   b. first reciprocated means adapted to be connected to a sprung mass and cooperating with an unsprung mass to load the elastomeric elements in a linear fashion causing said elements to coact in compression to yieldably absorb oscillations between masses;
   c. second reciprocated means adapted to be connected to the unsprung mass and movable in unison with the associated array of elastomeric elements as required by the load deflections thereon in absorbing loads generated by movement of the masses toward each other and adapted to move with the unsprung mass in a rebound of the masses away from each other beyond a predetermined loading point causing at least one of said elastomeric elements to be loaded in said rebound direction and yieldably absorb oscillations between masses in that direction whereby oscillatory movement is absorbed in both directions;
   d. said first reciprocated means including a pair of tubular housings received one within the other and telescoping into and out of each other in response to oscillations between said masses;
   e. said elastomeric elements being stacked one upon the other within said tubular housings in an associated array providing an elastomeric column substantially filling said housings with sufficient space being provided therein for elastic deformation of said column;
   f. said elastomeric elements being in the form of an annulus and when stacked within said housings define an elastomeric column hollow through the center;
   g. one of said housings having an internal guide rod extending from one end thereof axially of said column for preventing lateral shifting of said elastomeric elements; and,
   h. said second reciprocated means including a piston situated between adjacent elastomeric elements of said column, and a piston rod slidably coupled to said piston and extending axially of said housings for connection with said unsprung mass, said piston sliding on the piston rod as required by the load deflections on said elastomeric column in one load direction and being prevented from sliding on the piston rod in the opposite load direction when the rod is extended from said housings whereby the elastomeric elements between the piston and one end of the housings are elastically compressed in said opposite load direction;

7. A ride mechanism according to claim 6 wherein each of said elastomeric elements comprises:
   a. a center rigid plate member; and
   b. thick elastomeric sections bonded on opposite sides of said plate member, the outer circumferential edges of said elastomeric sections being beveled so as to provide in stacked array of said elastomeric column a series of annular grooves providing spaces interiorly of said housings for expansion of said elastomeric sections in substantially radial directions relative to the axis of said housings.

8. A ride mechanism according to claim 6 wherein said piston is positioned relative to the opposite ends of said elastomeric column approximately one-fourth the distance from the end adjacent said unsprung mass.

* * * * *